United States Patent
Ashrafi et al.

(10) Patent No.: US 6,185,485 B1
(45) Date of Patent: Feb. 6, 2001

(54) RELATIVE VEHICLE PLATFORM HAVING SYNCHRONIZED ADAPTIVE OFFSET CALIBRATION FOR LATERAL ACCELEROMETER AND STEERING ANGLE SENSOR

(75) Inventors: Behrouz Ashrafi; Dinu Petre Madau, both of Dearborn; Hongtei Eric Tseng, Canton, all of MI (US)

(73) Assignee: Ford Global Technologies, Inc, Dearborn, MI (US)

(*) Notice: Under 35 U.S.C. 154(b), the term of this patent shall be extended for 0 days.

(21) Appl. No.: 09/218,281

(22) Filed: Dec. 22, 1998

(51) Int. Cl.$^7$ ........................................................ B62D 6/00
(52) U.S. Cl. ........................ 701/1; 701/41; 701/73; 701/80; 701/37; 180/197; 280/5.507
(58) Field of Search ..................... 701/1, 41, 42, 701/70, 71, 72, 73, 80, 37, 38; 180/197, 400; 280/5.5, 5.507

(56) References Cited

U.S. PATENT DOCUMENTS

| | | | |
|---|---|---|---|
| 4,840,389 | 6/1989 | Kawabe et al. | 280/91 |
| 4,858,134 | 8/1989 | Eto et al. | 364/424.05 |
| 4,967,865 | 11/1990 | Schindler | 180/79.1 |
| 4,998,593 | 3/1991 | Karnopp et al. | 180/140 |
| 5,809,434 | * 9/1998 | Ashrafi et al. | 701/1 |

* cited by examiner

Primary Examiner—William A. Cuchlinski, Jr.
Assistant Examiner—Yonel Beaulieu
(74) Attorney, Agent, or Firm—Gregory P. Brown

(57) ABSTRACT

A system and method for vehicle dynamic control processes a compensated yaw rate signal measurement and a compensated lateral acceleration signal measurement (30, 32) to derive a signal measurement of road bank angle disturbance not compensated for in a compensated steering angle signal measurement and provides the derived signal to a controller (12). The compensated steering angle signal measurement is an input to the controller. Because a disturbance already compensated in the compensated steering angle signal measurement is transparent to the controller, the controller is able to adjust the control action of the vehicle dynamic control system based on the derived signal measurement of road bank angle disturbance not compensated for in a compensated steering angle signal measurement, thereby providing enhanced robustness of control.

5 Claims, 1 Drawing Sheet

RELATIVE VEHICLE PLATFORM HAVING SYNCHRONIZED ADAPTIVE OFFSET CALIBRATION FOR LATERAL ACCELEROMETER AND STEERING ANGLE SENSOR

BACKGROUND OF THE INVENTION

1. Field of the Invention

This invention relates generally to control of automotive vehicle dynamics, and more particularly to improvements in processing data from certain on-board sensors, including a lateral accelerometer, a steering wheel position sensor, and a yaw rate sensor, for accomplishing robust control in the presence of certain input disturbances, such as those due to road surface banking.

2. Background Information

Certain motion sensors, such as steering wheel position sensors, yaw rate sensors, and lateral accelerometers (lateral acceleration sensors), provide useful inputs to an automotive vehicle dynamic control system. Such a control system utilizes a microprocessor that processes data, including input signal measurements received from such sensors, to cause adjustments in and/or actuations of a dynamic control system. The responses of such sensors can be sufficiently fast in relation to vehicle motion that their signal measurements can very closely track changing values of the respective measured parameters in real time. Accordingly, a microprocessor-based control system which receives such signal measurements as inputs can quickly process them to perform desired control action, such as performing a control function that strives to correct for rapidly changing vehicle dynamics via an appropriate system of the vehicle.

The electric signal measurements of such sensors may be subject to D.C. bias, or offset, which can influence measurement accuracy. Two identifiable and independent causes of such bias, or offset, in a lateral acceleration sensor are electrical drift and road bank angle disturbance. One technique previously proposed for compensating a system with respect to such bias, or offset, involves adjustment by long-term filtering/averaging of the signal measurement; another involves adjustment based on functional redundancy with other sensors using recent (short-term) measurements from those other sensors. The "long-term" filtering/averaging methodology is robust to dynamic vehicle maneuvers, but may have difficulty in promptly tracking D.C. electrical drift. The "short-term" methodology based on sensor functional redundancy may be better at tracking D.C. electrical drift, but may be overly sensitive to dynamic vehicle maneuvers.

The inventors of the present invention have realized that those two prior techniques do not distinguish times when the particular compensation that they provide should be made from times when it should not. Hence, when such known techniques are embodied in a vehicle dynamic control system, they may, at certain times, furnish a response, or lack thereof, that causes the system to respond, or not respond, in a manner other than what may be considered the most desirable, given the nature of events prompting the performance of such techniques.

When a vehicle is traveling along a road that is banked, for example because the road surface has a crown, the driver will steer the vehicle so as to inherently compensate for the road bank angle. Because of the presence of road banking, the driver is actually manipulating the steering wheel to positions slightly different from positions that he would in the absence of road banking, often without consciously realizing that he is doing so.

Because the steering angle sensed by a steering wheel angle sensor is uninfluenced by road banking, the electric signal measurement which it provides will exactly correlate with actual straightline travel of the vehicle at only one road bank angle. For example, if a particular signal measurement correlates to straightline vehicle travel when the road bank angle is zero, that specific signal measurement will depart from indicating straightline vehicle ravel when the vehicle is traveling along a banked road because the driver will have to readjust the steering angle to compensate for the road bank. The extent to which that specific steering angle signal measurement deviates from representing true straightline vehicle travel increases as the road bank angle increases.

In certain driving situations, for example when a vehicle is traveling at a banked angle due to the nature of an underlying road surface, each of an electric signal measurement of steering angle provided by a steering angle sensor and an electric signal measurement of vehicle lateral acceleration provided by a lateral accelerometer may have a respective adaptive offset that is different from the corresponding absolute offset. Absolute offset means the offset existing in the absence of any disturbances (both electrical and mechanical) to the sensor, and such absolute offset may in fact be zero in value. In the example of a vehicle traveling along a crowned road at a banked angle, the adaptive steering wheel center (offset) may be significantly different from its mechanical center while the adaptive offset in the signal measurement of a lateral accelerometer may be significantly different from its electrical D.C. offset.

SUMMARY OF THE INVENTION

The present invention arises, at least in part, through recognition of the respective beneficial characteristics of each of the above-mentioned "short-term" and "long-term" methodologies, and ensuing selective employment of such beneficial characteristics to the exclusion of other characteristics of those methodologies, in improving the robustness of a vehicle dynamic control system.

An advantage of the invention is that it can be embodied either entirely, or at least in large part, in an existing vehicle system without additional hardware. This is because the disclosed solutions provided by implementation of the invention are in the form of software in programmed into existing microprocessor-based systems. These solutions are especially desirable for mass-produced automotive vehicles because they accomplish new and useful functions in a cost-effective manner.

One generic aspect of the invention relates to a method of enhancing dynamic control system robustness in an automotive vehicle comprising: compensating a steering angle signal from a steering angle sensor to provide a compensated steering angle signal measurement; compensating a lateral acceleration signal from a lateral acceleration sensor to provide a compensated lateral acceleration signal measurement; compensating a yaw rate signal from a yaw rate sensor to provide a compensated yaw rate signal measurement; processing the compensated yaw rate signal measurement and the compensated lateral acceleration signal measurement to derive a signal measurement of road bank angle disturbance not compensated for in the compensated steering angle signal; providing the compensated steering angle signal measurement and the signal measurement of road bank angle disturbance not compensated for in the compensated steering angle signal to adjust the control action of the vehicle dynamic control system.

Another generic aspect of the invention relates to an automotive vehicle comprising a dynamic control system for controlling at least one characteristic of vehicle dynamics, the control system comprising: a steering angle sensor providing a steering angle signal measurement; a first calibration filter for calibrating the steering angle signal measurement to a compensated steering angle signal measurement; a lateral acceleration sensor providing a lateral acceleration signal; a second calibration filter for calibrating the lateral acceleration signal measurement to a compensated lateral acceleration signal measurement; the first and second calibration filters having identical synchronization; a yaw rate sensor, including compensation, providing a compensated yaw rate signal measurement; a processor a) for the compensated yaw rate signal measurement and the compensated lateral acceleration signal measurement to derive a signal measurement of road bank angle disturbance not compensated for in the compensated steering angle signal measurement, b) providing the compensated steering angle signal measurement and the signal measurement of road bank angle disturbance not compensated for in the compensated steering angle signal to adjust the control action of the vehicle dynamic control system.

Still another generic aspect relates to an automotive vehicle comprising a dynamic control system for controlling at least one characteristic of vehicle dynamics, the control system comprising: a relative platform controller, including a processor; a steering angle sensor providing a steering angle signal measurement; a lateral acceleration sensor providing a lateral acceleration signal; first and second calibration filters for synchronously calibrating the steering angle signal and the lateral acceleration signal measurements to create respective synchronized compensated steering angle signal and lateral acceleration signal measurements; the relative platform controller including a processor for processing the synchronized compensated steering angle signal and lateral acceleration signal measurements with a signal measurement of road bank angle disturbance not compensated for in the compensated steering angle signal measurement to adjust the control action of the vehicle dynamic control system.

Other general and more specific aspects will be set forth in the ensuing description and claims.

BRIEF DESCRIPTION OF THE DRAWINGS

The drawing that will now be briefly described is incorporated herein to illustrate the inventive principles via an exemplary preferred embodiment and a best mode presently contemplated for carrying out those principles.

DESCRIPTION OF THE PREFERRED EMBODIMENT(S)

Figure 1:
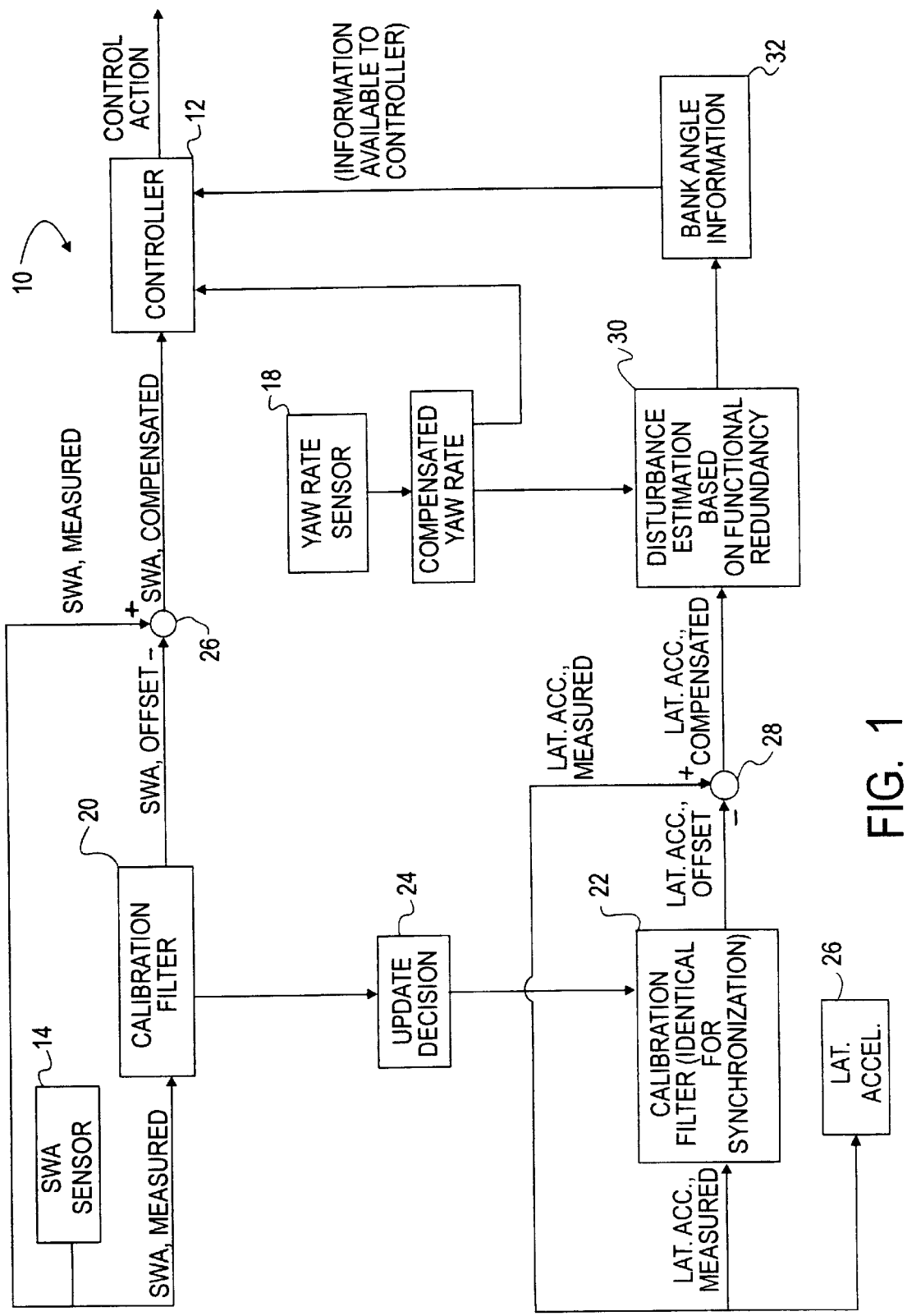
FIG. 1 is a schematic block diagram of a portion of a vehicle dynamic control system illustrating principles of the present invention.

FIG. 1 discloses an exemplary embodiment of the present invention as applied to a wheeled automotive vehicle. One type of such vehicle is commonly known as a rear wheel drive vehicle whose chassis has a pair of steerable front wheels and a pair of rear wheels. Principles of the invention will be disclosed herein with reference to such a rear wheel drive vehicle, but it is to be appreciated that the inventive principles may be applicable to other configurations.

The vehicle comprises a control system 10 including a controller 12 for performing a desired control action involving vehicle dynamics, such as correcting for driver oversteering during a maneuver. Various on-board motion sensors provide various electric signal measurements for enabling control system 10 to perform the desired control action via controller 12. The sensors include a steering wheel angle (SWA) sensor 14, sometimes called a steering angle sensor that provides a signal measurement of front wheel turning by the driver's turning of the vehicle's steering wheel, a lateral accelerometer 16 providing a signal measurement of lateral acceleration of the vehicle, and a yaw rate sensor 18 providing a signal measurement of vehicle yaw rate.

The signal of sensor 14 is an input to a calibration filter 20, and that of lateral accelerometer 16 is an input to a calibration filter 22. The two calibration filters 20, 22 are identical for the purpose of synchronization. Each filter may be a low-pass filter that accounts for the D.C. component in the signal for calibration purposes. Application of filters 20, 22 to the respective signal inputs is determined by an update decision 24. Details of such an update decision are not material to the invention because the synchronization does not "care" what update decision is made as long as the same decision is utilized by both filters. The application of filters 20, 22 to the respective signals develops respective offsets for the signals. Each offset is then algebraically summed, as represented in FIG. 1, with its respective signal measurement at a respective summing junction 26, 28 to create a respective compensated signal, namely a compensated steering angle signal and a compensated lateral acceleration signal.

The compensated lateral acceleration signal and a compensated yaw rate signal (compensated for its offset) have certain functional redundancy on a level surface. Because of such redundancy, but also because of certain difference between them, suitable processing of the compensated yaw rate signal and the compensated lateral acceleration signal, step 30 in FIG. 1, makes it possible to derive certain bank angle information, step 32, and hence derive a signal measurement representing a bank angle of the vehicle resulting from banking of the underlying road surface. The derived bank angle signal measurement can then be made available to controller 12, as shown. Controller 12 also receives the compensated steering angle signal measurement from summing junction 26. The derived bank angle signal measurement and the compensated steering angle signal measurement are processed by controller 12 to recognize driver intention under the influence of road conditions for the most desirable vehicle response.

Because of the synchronization in steering wheel angle and lateral accelerometer calibrations, and because of the functional redundancy inherent in compensated yaw rate and compensated lateral accelerometer signals, the invention is capable of providing what is believed to be more desirable information for robust vehicle control.

Road bank angle disturbance has some amount of influence in steering angle signal measurement relative to vehicle direction which may be compensated in the compensated steering angle signal measurement. The compensated steering angle signal measurement is then interpreted by controller 12 as a signal measurement representing driver-intended vehicle direction. Because control system 10 acts as a feedback control system that uses both the compensated yaw rate signal measurement and the compensated steering angle signal measurement to close feedback loops, it should be provided with a signal representing road bank angle disturbances unless such disturbances have already compensated for in the compensated steering angle signal measurement.

Enhancement of control system robustness can be provided by deriving the magnitude of road bank angle disturbances not compensated for in the steering angle calibration and making the result, referred to for convenience as Relative Bank Angle 1, available to controller 12. However, it is difficult, if not impossible, to determine what magnitude of bank angle has already been compensated in the compensated steering angle signal measurement because the steering angle signal may have been compensated for other less-than-ideal vehicle hardware, such as biased wheel alignment. On the other hand, the road bank angle disturbance effect in the lateral acceleration measurement may be compensated entirely in lateral acceleration offset calibration.

Because of the aforementioned functional redundancy in the compensated yaw rate and lateral acceleration signals, a road bank disturbance angle can be detected by analyzing them for deviation that is indicative of that angle. The detected deviation is an estimation of the road bank angle component not already compensated for in the calibration of the lateral accelerometer, and that component will be referred to for convenience as Relative Bank Angle 2.

Because of the synchronization and functional redundancy described earlier, Relative Bank Angle 2 signal is identical to Relative Bank Angle 1, the latter being a signal required by the controller for the enhancement of control system robustness. Controller 12 is therefore made robust to road bank angle disturbance by supplying a signal measurement of Relative Bank Angle 2 to it, as shown by step 32.

A relative, or floating, platform controller has a relative, or floating, or adaptive, DC offset in lateral acceleration and in steering angle (outputs of filters 20 and 22). Information required for true robust control action is Relative Bank Angle, meaning the variation between the actual bank angle encountered and whatever bank angle has already considered in the floating compensation. With the synchronized adaptive offset calibration and relative platform design, whatever road bank angle has been compensated in the compensated steering angle signal measurement and in the compensated lateral acceleration signal measurement becomes transparent to the controller.

Principles of the present invention relating to a relative platform controller call for adjusting the offsets of both the steering angle sensor and the lateral accelerometer such that the effect of disturbance on both signals is compensated. Consider for example a vehicle traveling along a crown road having a non-zero bank angle. Both offsets can be adjusted, depending on the update decision used, such that the Relative Bank Angle is zeroed, despite the actual bank angle being non-zero. Because the signals of both steering angle sensor and lateral accelerometer are created as dynamically compatible at all times, the road bank disturbance is made transparent to the controller.

While a presently preferred embodiment has been illustrated and described, it is to be appreciated that the invention may be practiced in various forms within the scope of the following claims.

What is claimed is:

1. A method of enhancing dynamic control system robustness in an automotive vehicle comprising:
   compensating a steering angle signal from a steering angle sensor to provide a compensated steering angle signal measurement;
   compensating a lateral acceleration signal from a lateral acceleration sensor to provide a compensated lateral acceleration signal measurement;
   compensating a yaw rate signal from a yaw rate sensor to provide a compensated yaw rate signal measurement;
   processing the compensated yaw rate signal measurement and the compensated lateral acceleration signal measurement to derive a signal measurement of road bank angle disturbance not compensated for in the compensated steering angle signal;
   providing the compensated steering angle signal measurement and the signal measurement of road bank angle disturbance not compensated for in the compensated steering angle signal to adjust the control action of the vehicle dynamic control system.

2. A method as set forth in claim 1 including using respective calibration filters with identical synchronization to create the compensated lateral acceleration signal measurement and the compensated steering angle measurement respectively by processing the lateral acceleration signal and the steering angle signal respectively in the respective calibration filters.

3. A method as set forth in claim 1 including using the compensated yaw rate signal in controlling the vehicle dynamic control system.

4. An automotive vehicle comprising a dynamic control system for controlling at least one characteristic of vehicle dynamics, the control system comprising:
   a steering angle sensor providing a steering angle signal measurement;
   a first calibration filter for calibrating the steering angle signal measurement to a compensated steering angle signal measurement;
   a lateral acceleration sensor providing a lateral acceleration signal;
   a second calibration filter for calibrating the lateral acceleration signal measurement to a compensated lateral acceleration signal measurement;
   the first and second calibration filters having identical synchronization;
   a yaw rate sensor, including compensation, providing a compensated yaw rate signal measurement;
   a processor a) for the compensated yaw rate signal measurement and the compensated lateral acceleration signal measurement to derive a signal measurement of road bank angle disturbance not compensated for in the compensated steering angle signal measurement, b) providing the compensated steering angle signal measurement and the signal measurement of road bank angle disturbance not compensated for in the compensated steering angle signal to adjust the control action of the vehicle dynamic control system.

5. An automotive vehicle comprising a dynamic control system for controlling at least one characteristic of vehicle dynamics, the control system comprising:
   a relative platform controller, including a processor;
   a steering angle sensor providing a steering angle signal measurement;
   a lateral acceleration sensor providing a lateral acceleration signal;
   first and second calibration filters for synchronously calibrating the steering angle signal and the lateral acceleration signal measurements to create respective synchronized compensated steering angle signal and lateral acceleration signal measurements;
   the relative platform controller including a processor for processing the synchronized compensated steering angle signal and lateral acceleration signal measurements with a signal measurement of road bank angle disturbance not compensated for in the compensated steering angle signal measurement to adjust the control action of the vehicle dynamic control system.

* * * * *